(12) United States Patent
Robertson et al.

(10) Patent No.: US 7,875,671 B2
(45) Date of Patent: Jan. 25, 2011

(54) PROCESS FOR PREPARING FILLER-DISPERSED POLYMERIC COMPOSITIONS

(75) Inventors: Christopher G. Robertson, Akron, OH (US); Terrence E. Hogan, Akron, OH (US); William L. Hergenrother, Akron, OH (US)

(73) Assignee: Bridgestone Corporation (JP)

( * ) Notice: Subject to any disclaimer, the term of this patent is extended or adjusted under 35 U.S.C. 154(b) by 535 days.

(21) Appl. No.: 11/890,139

(22) Filed: Aug. 3, 2007

(65) Prior Publication Data

US 2008/0033098 A1 Feb. 7, 2008

Related U.S. Application Data

(60) Provisional application No. 60/835,591, filed on Aug. 3, 2006.

(51) Int. Cl.
*B60C 1/00* (2006.01)
*C08K 3/34* (2006.01)
*C08K 3/04* (2006.01)

(52) U.S. Cl. ............................... 524/495; 524/492
(58) Field of Classification Search .................. 524/492, 524/495
See application file for complete search history.

(56) References Cited

U.S. PATENT DOCUMENTS

| | | | |
|---|---|---|---|
| 3,109,871 A | 11/1963 | Zelinski et al. | |
| 3,135,716 A | 6/1964 | Uraneck et al. | |
| 4,485,833 A | 12/1984 | Uraneck et al. | |
| 4,519,431 A | 5/1985 | Yoshimura et al. | |
| 4,540,744 A | 9/1985 | Oshima et al. | |
| 4,603,722 A | 8/1986 | Oshima et al. | |
| 4,616,069 A | 10/1986 | Watanabe et al. | |
| 4,677,165 A | 6/1987 | Kikuchi et al. | |
| 4,929,679 A | 5/1990 | Akita et al. | |
| 5,109,907 A | 5/1992 | Stayer et al. | |
| 5,115,035 A | 5/1992 | Shiraki et al. | |
| 5,210,145 A | 5/1993 | Lawson et al. | |
| 5,219,942 A | 6/1993 | Suzuki et al. | |
| 5,227,431 A | 7/1993 | Lawson et al. | |
| 5,248,722 A | 9/1993 | DeTrano et al. | |
| 5,268,439 A | 12/1993 | Hergenrother et al. | |
| 5,329,005 A | 7/1994 | Lawson et al. | |
| 5,332,810 A | 7/1994 | Lawson et al. | |
| 5,349,024 A | 9/1994 | Hergenrother et al. | |
| 5,393,721 A | 2/1995 | Kitamura et al. | |
| 5,491,230 A | 2/1996 | Lawson et al. | |
| 5,496,940 A | 3/1996 | Lawson et al. | |
| 5,502,129 A | 3/1996 | Hergenrother et al. | |
| 5,521,309 A | 5/1996 | Antkowiak et al. | |
| 5,552,473 A | 9/1996 | Lawson et al. | |
| 5,574,109 A | 11/1996 | Lawson et al. | |
| 5,578,542 A | 11/1996 | Lawson et al. | |
| 5,698,646 A | 12/1997 | Kitamura et al. | |
| 5,786,441 A | 7/1998 | Lawson et al. | |
| 5,877,336 A | 3/1999 | Hergenrother et al. | |
| 5,902,856 A | 5/1999 | Suzuki et al. | |
| 5,916,976 A | 6/1999 | Kerns et al. | |
| 5,935,893 A | 8/1999 | Lawson et al. | |
| 6,080,853 A | 6/2000 | Corrigan et al. | |
| 6,359,167 B2 | 3/2002 | Toone et al. | |
| 6,596,798 B1 | 7/2003 | Rademacher et al. | |
| 7,153,919 B2 | 12/2006 | Hogan et al. | |
| 2003/0109625 A1* | 6/2003 | Galimberti et al. | 524/495 |
| 2003/0111770 A1* | 6/2003 | Bohm et al. | 264/349 |
| 2004/0152811 A1* | 8/2004 | Lin et al. | 524/261 |
| 2004/0152822 A1* | 8/2004 | Biggi et al. | 524/493 |
| 2006/0074197 A1* | 4/2006 | Hogan et al. | 525/331.9 |
| 2006/0086450 A1 | 4/2006 | Hogan et al. | |
| 2006/0178467 A1 | 8/2006 | Fukushima et al. | |
| 2006/0264589 A1 | 11/2006 | Yan | |
| 2006/0264590 A1 | 11/2006 | Hogan et al. | |

FOREIGN PATENT DOCUMENTS

| | | |
|---|---|---|
| WO | WO 2004/020475 A1 | 3/2004 |
| WO | WO 2004/041870 A2 | 5/2004 |
| WO | WO 2006/050486 A1 | 5/2006 |

OTHER PUBLICATIONS

T. E. Hogan, Y-Y Yan, W. L. Hergenrother, and D. F. Lawson, "Lithiated Thiaacetals as Initiators for Living Anionic Polymerization of Diene Elastomers: Polymerization and Compounding, " Rubber Chem. Technol. 80, 194 (2007).

W. L. Hergenrother, J. D. Ulmer, and C. G. Robertson, "Assignment of Effective Network Chains in Cured Rubbers Derived from Chemical Crosslinking, Entanglements, Polymer End Linking to Carbon Black and Filler Interaction: VII. Tensile Retraction Measurements," Rubber Chem. Technol. 79, 338 (2006).

J. D. Ulmer, W. L. Hergenrother, and D. F. Lawson, "Hysteresis Contributions in Carbon Black-Filled Rubbers Containing Conventional and Tin End-Modified Polymers," Rubber Chem. Technol. 71, 637 (1998).

* cited by examiner

*Primary Examiner*—Mark Eashoo
*Assistant Examiner*—Angela C Scott
(74) *Attorney, Agent, or Firm*—Meredith E. Hooker; Arthur Reginelli

(57) ABSTRACT

A method for preparing a polymeric composition, the method comprising introducing a functionalized polymer and a filler. Mixing the functionalized polymer and filler to form a first masterbatch, adding additional polymer to the first masterbatch, and mixing the additional polymer and the first masterbatch.

21 Claims, No Drawings

PROCESS FOR PREPARING FILLER-DISPERSED POLYMERIC COMPOSITIONS

This application claims the benefit of U.S. Provisional Application No. 60/835,591, filed Aug. 3, 2006, which is incorporated herein by reference.

FIELD OF THE INVENTION

One or more embodiments of the present invention relate to processes for preparing polymeric compositions having filler dispersed therein, particularly those compositions that are useful for preparing tire components.

BACKGROUND OF THE INVENTION

Synthetic polymers may be employed in the production of tires. It has been found that polymers bearing a functional group can provide vulcanizates having reduced hysteresis loss. As a result, it has been found advantageous to employ functionalized polymers in the preparation of tire components such as tire treads.

It is believed that the reduction in hysteresis loss can be attributed to the reduction in filler agglomeration or reduction in polymer free ends. These reductions are believed to result from interaction between filler particles and the functional group. While it is believed that the functional group and filler particles may undergo interaction or reaction, it is believed that only a certain percentage of the functional groups react or interact with filler particles. It is also believed that by increasing the number or percentage of reactions or interactions between the functional groups and the filler particles, a further reduction in hysteresis loss can be achieved.

SUMMARY OF THE INVENTION

One or more embodiments of the present invention provides a method for preparing a polymeric composition, the method comprising introducing a functionalized polymer and a filler, mixing the functionalized polymer and filler to form a first masterbatch, adding additional polymer to the first masterbatch, and mixing the additional polymer and the first masterbatch.

DETAILED DESCRIPTION OF ILLUSTRATIVE EMBODIMENTS

One or more embodiments of the present invention are directed toward a method for preparing a composition including functionalized polymer and filler. In certain embodiments, practice of the present invention provides rubber vulcanizates that demonstrate reduced hysteresis loss as compared to similar compositions prepared by conventional techniques.

While unique methods are employed to prepare the compositions of the present invention, the ingredients employed in one or more embodiments, including the functionalized polymer, are known in the art of making rubber compositions (e.g., U.S. Pat. Nos. 6,596,798; 5,268,439; and 6,080,853, which are incorporated herein by reference), particularly compositions employed to fabricate tire components. In one or more embodiments, the ingredients include functionalized polymer, rubbery polymer, filler, and curative.

Rubbery polymers include those polymers that can be vulcanized or cured to provide elastomers. In one or more embodiments, rubber polymers include unsaturated polymers.

Exemplary rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped.

In one or more embodiments, the unsaturated polymer may have a number average molecular weight ($M_n$) of from about 5 to about 1,000 kg/mole, in other embodiments from about 50 to about 500 kg/mole, and in other embodiments 100 to about 300 kg/mole. In these or other embodiments, the unsaturated polymer may also be characterized by a weight average molecular weight ($M_w$) of from about 5 to about 3,000 kg/mole, in other embodiments from about 50 to about 2,000 kg/mole, and in other embodiments 100 to about 1,200 kg/mole. Molecular weight may be determined using Gel Permeation Chromatography (GPC) calibrated with polystyrene standards and adjusted for the Mark-Houwink constants for the polymer in question.

In one or more embodiments, the unsaturated polymers may also be characterized by a glass transition temperature (Tg) of less than 20° C., in other embodiments less than 0° C., in other embodiments less than −20° C., and in other embodiments less than −30° C. In these or other embodiments, the polymers may be characterized by a single glass transition temperature.

Functionalized polymers include one or more functional groups. The polymer to which the functional group is attached may include a rubbery polymer as described above. The functional group may be tethered or attached to the polymer at the head and/or tail of the polymer, and in certain embodiments may be pendant to the polymer chain. Functional polymers may include multiple functional groups including head and tail functionalization. As those skilled in the art appreciate, head functionalization refers to the presence of a functional group at or near the location of initiation of the polymer, and tail functionalization refers to the presence of a functional group at or near the location of termination of the polymer.

In one or more embodiments, functional groups include those substituents that reduce the 50° C. hysteresis loss of a carbon black-filled vulcanizate as compared to similar carbon black-filled vulcanizates without the functional group. In one or more embodiments, this reduction in hysteresis loss is at least 5%, in other embodiments at least 10%, and in other embodiments at least 15%. In other embodiments, functional groups include those groups that will have a similar impact on silica-filled or mixed carbon black/silica-filled compositions. In one or more embodiments, the functional groups include a hetero atom. These hetero atom-bearing substituents include those that may generally be characterized as an electron rich species or metal-containing species. Functional groups include those substituents that react or interact with rubber or rubber fillers or otherwise have a desirable impact on filled rubber compositions or vulcanizates.

Numerous functional groups are known in the art. Exemplary functional groups include tin-containing groups, nitrogen-containing groups, boron-containing groups, oxygen-containing groups, phosphorous-containing groups, and sulfur-containing groups. Exemplary tin-containing groups include trialkyltin groups such as tributyl tin and trioctyltin groups. Exemplary nitrogen-containing groups include cyclic amine groups such as hexamethyleneimine groups, pyrollidine groups, and aziridine groups. Exemplary sulfur-containing groups include sulfur-containing azaheterocycle groups, and dithiane groups. Exemplary oxygen-containing groups include carbonyl-containing groups, oxygen-containing and azaheterocycle.

Exemplary phosphorous-containing functionalized polymers are disclosed in U.S. Pat. No. 4,485,833; exemplary oxygen-containing azaheterocycle functionalized polymers are disclosed in U.S. Pat. No. 6,596,798; exemplary oxygen-containing and sulfur-containing heterocycle functionalized polymers are disclosed in International Publication No. WO 2004/020475; exemplary trialkyl tin substituent functionalized polymers are disclosed in U.S. Pat. No. 5,268,439; exemplary cyclic amine functionalized polymers are disclosed in U.S. Pat. No. 6,080,853; exemplary aryl or alkyl thio acetal (e.g., dithianes) functionalized polymers are disclosed in International Publication No. WO 2004/041870, all of which are incorporated herein by reference.

In one or more embodiments, the functionalized polymers may be prepared by initiating the anionic polymerization of conjugated diene monomer (optionally together with vinyl aromatic monomer) with an initiator bearing one or more functional groups (i.e., a functional initiator). In these or other embodiments, the functionalized polymer may be prepared by terminating living polymers, prepared from conjugated diene monomers optionally together with vinyl aromatic monomer, with a terminating agent bearing one or more functional groups (i.e., a functional terminator). In one or more embodiments, both a functional initiator and a functional terminator may be employed. Many functional initiators and functional terminators are known in the art. Exemplary functional initiators are disclosed in U.S. Pat. Nos. 5,332,810, 5,329,005, 5,578,542, 5,393,721, 5,698,646, 5,491,230, 5,521,309, 5,496,940, 5,574,109, 5,786,441, 7,153,919, U.S. Patent Publication Nos. 2006/0264590, and 2006/0264589, and International Publication Nos. WO 2004/020475 and WO 2004/041870, which are incorporated herein by reference. Exemplary functional terminators are disclosed in U.S. Pat. Nos. 3,109,871, 3,135,716, 5,332,810, 5,109,907, 5,210,145, 5,227,431, 5,329,005, 5,935,893, 4,519,431, 4,540,744, 4,603,722, 5,248,722, 5,349,024, 5,502,129, 5,877,336, 786, 441, 5,916,976 5,552,473, 5,786,441, 5,916,976 5,552,473, 4,677,165, 5,219,942, 5,902,856, 4,616,069, 4,929,679, 5,115,035, 6,359,167, 6,596,798, U.S. Publication Nos. 2006/0086450, 2006/0178467, International Publication Nos. WO 2004/020475, WO 2006/050486, and U.S. Ser. No. 11/189,891, which are incorporated herein by reference.

The filler may include those conventionally employed in the preparation of tire components and/or vulcanizates. These fillers may include inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulphur or peroxide-based curing systems. Curing agents are described in 20 Kirk-Othmer, *Encyclopaedia of Chemical Technology*, 365-468, ($3^{rd}$ Ed. 1982), particularly Vulcanization Agents and Auxiliary Materials, 390-*402, and A. Y. Coran, *Vulcanization in Encyclopaedia of Polymer Science and Engineering*, (second Ed. 1989), which are incorporated herein by reference. Vulcanizing agents may be used alone or in combination. The curative may be used in conjunction with cure accelerators.

Other ingredients that may be employed include accelerators, oils, waxes, scorch inhibiting agents, processing aids, zinc oxide, tackifying resins, reinforcing resins, fatty acids such as stearic acid, peptizers, silica coupling agents, silica shielding and/or dispersing agents, thermoplastic polymers, and/or additional rubbers.

Useful coupling and shielding agents are disclosed in U.S. Pat. Nos. 3,842,111, 3,873,489, 3,978,103, 3,997,581, 4,002, 594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

A first masterbatch, which may also be referred to as a stage-1 product, is initially prepared by introducing functionalized polymer and filler, and mixing the functionalized polymer and filler. This step may be referred to as an initial mixing step or stage, the stage-1 mixing step, or the first masterbatch mixing step.

In one or more embodiments, the introduction of functionalized polymer and/or filler may occur as a single feed to the mixing vessel or as incremental additions to the mixing vessel. For example, the functionalized polymer can be first introduced to the mixing vessel, and the filler can be subsequently added to the functionalized polymer. The addition of filler or polymer can occur as a single addition or as multiple or sequential additions.

In one or more embodiments, the weight ratio of filler to functionalized polymers introduced in stage-1 is set or adjusted so as to increase physical contacts between the functional group and the filler particle. In one or more embodiments, the weight ratio of filler to functionalized polymer is at least 0.4:1, in other embodiments at least 0.45:1, in other embodiments at least 0.5:1, in other embodiments at least 0.55:1, and in other embodiments at least 0.6:1. In these or other embodiments, the weight ratio of functionalized polymer to filler is set or adjusted so as to maintain a composition that is processable on a mill. As is known in the art, processing additives, such as oils, can be added to extend the rubber composition and increase the potential weight limits of filler to functionalized polymer while maintaining a composition that is processable on a mill. In one or more embodiments, the weight ratio of the filler to functionalized polymer is at most 1:1, in other embodiments at most 0.90:1, and in other embodiments at most 0.8:1.

In one or more embodiments, the amount of non-functional polymer introduced in the stage-1 mixing step may be limited. In certain embodiments, less than 10% by weight, in other embodiments less than 5% by weight, and in other embodiments less than 1% by weight of the total polymer introduced in this stage includes non-functional polymer. In certain embodiments, the ingredients mixed within stage-1 are substantially devoid of non-functionalized polymer, where substantially devoid refers to that amount or less that would otherwise have an appreciable impact on the composition or process if present. In one or more embodiments, the ingredients introduced in the first masterbatch mixing stage are devoid of non-functionalized polymer.

In one or more embodiments, the introducing and mixing of functionalized polymer and filler within the stage-1 mix may take place within a mixing vessel. Those mixing vessels conventionally employed in the art of mixing polymers may be used. In one or more embodiments, the mixing vessels may include batch mixing vessels such as those that are employed in the art of mixing tire ingredients. In one or more embodiments, the mixing vessels may include Brabender mixers, Banbury mixers, twin and single screw extruders, and two-roll mills.

In one or more embodiments, the mixing vessel may be operated using conventional parameters for mixing speed, pressure, and temperature. In certain embodiments, particularly where a Brabender mixer is employed in the stage-1 mix, the mixer may be operated at from about 1 to about 100 rpm, and in other embodiments from about 10 to about 60 rpm for mixing within the masterbatch stage. In certain embodiments, particularly where a Brabender mixer is employed in the stage-1 mix, the mixer may be set at an initial temperature of from about 28° C. to about 138° C., in other embodiments from about 50° C. to about 100° C., and in other embodiments from about 80° C. to about 120° C., for the masterbatch stage. In certain embodiments, the mixer may be operated at conditions so as to achieve a stage-1 masterbatch temperature at the end of mixing (i.e., drop temperature) of from about 150° C. to about 220° C. and in other embodiments from about 160° C. to about 200° C.

In one or more embodiments, mixing within the stage-1 mix is continued for a time and at conditions sufficient to achieve an advantageous dispersion of the filler within the functionalized polymer. In one or more embodiments, mixing is continued at a time and at conditions sufficient to achieve a stage-1 product characterized by a dispersion index of at least 40, in other embodiments at least 50, and in other embodiments at least 60 as measured by using a Surfanalyzer according to ASTM D 2663-95a, part C.

After the first masterbatch has been mixed within the stage-1 mixing step, it may be advantageous to further process the stage-1 product on a mill. Techniques for milling polymeric compositions are known in the art and may be employed in practicing this invention.

After the functionalized polymer and filler have been introduced and mixed to form the first masterbatch, additional polymer is introduced with the first masterbatch and mixed. The introducing and mixing of additional polymer with the first masterbatch may be referred to as the second masterbatch step or stage, the stage-2 mixing step, or simply the step of adding non-functionalized polymer. In certain embodiments, the first masterbatch is not milled; instead, the second masterbatch ingredients are added directly to the mixing vessel in which the first masterbatch is prepared without removal or dropping of the first masterbatch. This latter method may be referred to as delayed addition of the second masterbatch ingredients.

In one or more embodiments, the additional polymer includes non-functionalized polymer. In certain embodiments, at least 80%, in other embodiments at least 90%, in other embodiments at least 95%, and in other embodiments 100% of the additional polymers introduced and mixed in second masterbatch step is non-functionalized polymer. In one or more embodiments, the non-functionalized polymer includes natural rubber.

In one or more embodiments, the amount of non-functionalized polymer introduced with the second masterbatch step may be described with reference to the weight ratio of non-functionalized polymer to functionalized polymer (i.e., the weight of non-functionalized polymer added in the second step has a weight ratio to the amount of functionalized polymer present in the stage-1 product). In one or more embodiments, the weight ratio of non-functionalized polymer to functionalized polymer may be from about 3:1 to about 1:10, in other embodiments from about 2:1 to about 1:5, and in other embodiments from about 1:1 to about 1:4. In other embodiments, the weight ratio of non-functionalized polymer to functionalized polymer may be at least 0.18:1, in other embodiments at least 0.3:1, and in other embodiments at least 0.4:1. The step of introducing and mixing the non-functionalized polymer with the first masterbatch may take place within a mixing vessel similar to those employed in the formation of the masterbatch. In certain embodiments, the same mixing vessel employed to introduce and mix the first masterbatch ingredients is employed to introduce and mix the non-functionalized polymer in the second masterbatch step.

During this second masterbatch mixing stage, the mixing vessel may be operated using conventional parameters for mixing speed, pressure, and temperature. In certain embodiments, particularly where a Brabender mixer is employed, the mixer may be operated at from about 1 to about 100 rpm, and in other embodiments from about 10 to about 60 rpm after introduction of the non-functionalized polymer. In certain embodiments, particularly where a Brabender mixer is employed, the mixer may be set at an initial temperature of from about 28° C. to about 130° C., in other embodiments from about 50° C. to about 100° C., or in other embodiments from about 80° C. to about 120° C., during the second mixing stage. In certain embodiments, the mixer may be operated at conditions so as to achieve a drop temperature of about 150° C. to about 220° C., and in other embodiments from about 160° C. to about 200° C.

In one or more embodiments, the non-functionalized polymer may be mixed with the masterbatch for a time and at conditions sufficient to achieve a product characterized by a dispersion index of at least 50, in other embodiments at least 60, and in other embodiments at least 70 as measured by using a Surfanalyzer according to ASTM D 2663-95a, part C.

In addition to adding non-functional polymer to the masterbatch, other ingredients may be added to the masterbatch during this second mixing stage. In one or more embodiments, especially where silica filler is employed, a silica shielding or coupling agent may be added to the masterbatch and mixed.

After the additional polymer (e.g., non-functionalized polymer) has been introduced and mixed into the masterbatch during the second mixing stage, it may be advantageous to process this compound on a mill. Conventional techniques may be employed.

In addition to or in lieu of milling either the first masterbatch or the second masterbatch, it may be desirable to further mix the masterbatch in a remill mixing step. As is known in the art, a remill mixing step may include additional mixing within a mixing vessel (e.g., Brabender mixer) without the introduction of additional ingredients. Remills may occur at elevated temperature by heating the masterbatches during mixing so as to achieve drop temperatures similar to those observed during drop of the first or second masterbatch.

After the non-functionalized polymer has been introduced and mixed into the masterbatch, a curative may be added to the composition and mixed to form a vulcanizable composition. The introducing and mixing of curative into the composition may be referred to as the final step or stage, or simply the step of adding curative.

Those skilled in the art will be able to readily select an appropriate curative and amount of curative to be employed based upon desired cure levels.

The mixing vessel employed for the step of introducing a mixing curative may be similar to those employed in the previous steps. In certain embodiments, the same mixing vessel employed to mix the masterbatch and to mix the non-functionalized polymer into the masterbatch may be employed to mix the curative and form a vulcanizable composition.

The mixing vessel may be operated using conventional parameters for mixing speed, pressure, and temperature. In certain embodiments, particularly where a Brabender mixer is employed, the mixer may be operated at from about 10 to about 100 rpm, and in other embodiments from about 10 to about 60 rpm for mixing the curative into the composition. In certain embodiments, particularly where a Brabender mixer is employed, the mixer may be set at an initial temperature of from about 28° C. to about 130° C., and in other embodiments from about 50° C. to about 100° C. during for mixing the curative. In certain embodiments, the mixer may be operated at conditions so as to achieve a drop temperature of from about 75° C. to about 120° C., and in other embodiments from about 80° C. to about 110° C. for the vulcanizable composition.

In one or more embodiments, this mixing stage is continued for a time and at conditions sufficient to achieve a product characterized by a dispersion index of at least 60, in other embodiments at least 70, and in other embodiments at least 80 as measured by using a Surfanalyzer according to ASTM D 2663-95a, part C.

After the curative has been added and mixed into the composition to form a vulcanizable composition, it may be advantageous to further process the vulcanizable composition on a mill. Conventional procedures may be employed.

These vulcanizable rubber compositions, which may also be referred to as stocks, are useful for forming tire components such as treads, subtreads, black sidewalls, body ply skins, bead filler, and the like. Where the vulcanizable rubber compositions are employed in the manufacture of tires, these compositions can be processed into tire components according to ordinary tire manufacturing techniques including standard rubber shaping, molding and curing techniques. In one or more embodiments, the vulcanizable composition is extruded into a green tire component. The green tire component is then employed to fabricate a green tire, and the green tire is placed within a mold and cured (i.e., vulcanized).

Vulcanization may be effected by heating the mold to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Examples 1-4

Four rubber mixtures where prepared by employing the formulation set forth in Table I.

TABLE I

| | (phr) |
|---|---|
| Stage-1 | |
| Functionalized Polymer | 70 |
| Oil | 10.5 |
| Carbon Black | 41 |
| Stearic Acid | 2 |
| Wax Blend | 1 |
| Zinc Oxide | 2.5 |
| Antioxidant | 0.95 |
| Stage-1 Product Total | 127.95 |
| Stage-2 | |
| Natural Rubber | 30 |
| Stage-2 Product Total | 157.95 |
| Final Batch | |
| Sulfur | 1.3 |
| DPG Accelerator | 0.2 |
| CBS Accelerator | 1.7 |

The functionalized polymer was an anionically-polymerized styrene-butadiene rubber that was initiated with tributyltin lithium and terminated with a mixture of tin tetrachloride and tributyltin chloride. The functionalized polymer was characterized by a Mooney Viscosity ($ML_{1+4}$@100° C.) of 58, and a Tg of −44° C.

The rubber mixture was prepared by initially forming a 65 g stage-1 batch within a Brabender mixer operating at 60 r.p.m. and an initial temperature of 130° C. The stage-1 ingredients were added to the mixer as follows. The functionalized polymer was initially added (i.e., Time=0), followed by the carbon black, stearic acid, wax, zinc oxide, and antioxidant after 30 seconds of mixing (i.e., Time=0.5). Natural rubber was added as the stage-2 ingredient. The length of time that the stage-1 ingredients were mixed in the absence of the stage-2 ingredients (i.e., prior to the addition of natural rubber) was varied as set forth in Table II. Each mixture was mixed for a total of six minutes (i.e., stage-1 plus stage-2). It is noted that Sample 1 was a control where the stage-1 and stage-2 ingredients were combined in one step.

Immediately following formation of the stage-2 product, the mixture 20 was transferred to a mill operating at a temperature of 60° C., where it was milled, sheeted, and subsequently cooled to room temperature. The final batch was prepared by adding the stage-2 product and the final batch ingredients (i.e., sulfur and accelerators) to the Brabender mixer simultaneously. The mixer had an initial temperature of 70° C. and a mixing speed of 40 r.p.m. The final mixture was removed from the mixer after 2.5 minutes, and the temperature of the mixture was about 90-100° C. The final batches were milled and sheeted using a mill at 60° C. The Mooney viscosity of these green rubber samples was determined as reported in Table II. The samples were also tested for bound rubber and rheological cure behavior as set forth in Table II. Also, button samples (7.9 mm×15 mm) and sheets (15.24 cm×15.24 cm×0.19 cm; 15.24 cm×15.24 cm×0.25 cm) were formed and cured at 171° C. for 15 minutes in standard molds placed in a hot press. The results of various mechanical and viscoelastic properties of the cured samples are set forth in Table II.

TABLE II

| Sample | 1 | 2 | 3 | 4 |
|---|---|---|---|---|
| Stage-1 Time (min.) | 0 | 1.5 | 3 | 4.5 |
| Stage-2 Time (min.) | 6 | 4.5 | 3 | 1.5 |
| $ML_{1+4}$ @ 130° C. | 57.5 | 59.8 | 61.0 | 61.3 |
| 50% Modulus @ 23° C. (MPa) | 1.03 | 0.98 | 0.95 | 0.98 |
| 300% Modulus @ 23° C. (MPa) | 9.63 | 9.45 | 9.65 | 9.91 |
| Tensile Break Stress @ 23° C. (MPa) | 19.3 | 19.3 | 18.3 | 20.4 |
| Elongation at Break @ 23° C. (MPa) | 460 | 467 | 443 | 468 |
| 50% Modulus @ 100° C. (MPa) | 0.86 | 0.83 | 0.79 | 0.84 |
| 200% Modulus @ 100° C. (MPa) | 3.99 | 3.90 | 3.82 | 4.04 |
| Tensile Break Stress @ 100° C. (MPa) | 7.76 | 7.12 | 6.49 | 7.41 |
| Elongation at Break @ 100° C. (%) | 297 | 286 | 272 | 284 |
| tan δ [torsion strip; 0° C.; 5 Hz, 2%] | 0.251 | 0.258 | 0.254 | 0.257 |
| G' (MPa) [torsion strip; 0° C.; 5 Hz, 2%] | 4.52 | 4.84 | 4.60 | 4.39 |
| tan δ [torsion strip; 50° C.; 5 Hz, 2%] | 0.108 | 0.109 | 0.101 | 0.102 |
| G' (MPa) [torsion strip; 50° C.; 5 Hz, 2%] | 2.72 | 2.76 | 2.67 | 2.55 |
| ΔG' (MPa) [torsion button; 50° C.; 1 Hz 0.25-14%] | 0.54 | 0.55 | 0.54 | 0.47 |
| tan δ [torsion button; 50° C.; 1 Hz 5%] | 0.095 | 0.095 | 0.092 | 0.086 |
| G' (MPa) [torsion button; 50° C.; 1 Hz 5%] | 1.77 | 1.79 | 1.80 | 1.76 |
| tan δ [Dynastat compression button; 50° C., 1 Hz] | 0.090 | 0.094 | 0.086 | 0.083 |
| Bound Rubber (%) | 44.3 | 43.3 | 48.8 | 50.4 |
| Surfanalyzer Macrodispersion (Dispersion Index) | 87.8 | 87.5 | 91.1 | 98.2 |

Tensile mechanical properties were measured using ASTM-D 412 at 25° C. Dynamic properties were determined by using a Rheometrics Dynamic Analyzer (RDA). Tan δ was obtained from temperature sweep experiments conducted with a frequency of 31.4 rad/sec using 0.5% strain for temperatures ranging from −100° C. to −10° C., and with 2% strain for temperatures ranging from −10° C. to 100° C. Strain sweep experiments on an RPA 2000 Rubber Process Analyzer (Alpha Technologies) were used to obtain ΔG' data, at a frequency of 1.0 Hz (3.14 rad/sec) and a temperature of 50° C., with strain sweeping from 0.25% to 1000%.

The green stock Mooney viscosity measurements were taken at 130° C. The sample was preheated for 1 minute, a large rotor was started, and the torque was measured after 4 minutes of rotation. Bound rubber was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula % bound rubber=$(100(W_d-F))/R$ where $W_d$ is the weight of the dried residue, F is the weight of the filler and any other solvent insoluble matter in the original sample, and R is the weight of the rubber in the original sample. The dispersion index (DI) was determined by using a Surfanalyzer according to ASTM D2663-95a, part c.

Various modifications and alterations that do not depart from the scope and spirit of this invention will become apparent to those skilled in the art. This invention is not to be duly limited to the illustrative embodiments set forth herein.

What is claimed is:

1. A method for preparing a polymeric composition, the method comprising:
   (i) introducing a functionalized polymer and a filler to form a blend;
   (ii) mixing the blend under conditions to achieve a temperature of from 160° C. to 220° C., where said mixing takes place for a time duration t;
   (iii) adding to the blend, after a time 0.5t, additional polymer;
   (iv) cooling the blend including functionalized polymer, filler, and additional polymer; and
   (v) introducing to the blend including functionalized polymer, filler, and additional polymer a curative and mixing the blend including functionalized polymer, filler, additional polymer, and curative under conditions to achieve a temperature of from about 75° C. to 120° C. to thereby form a vulcanizable composition of matter.

2. The method of claim 1, further comprising the step of extruding the vulcanizable composition into a green tire component.

3. The method of claim 2, further comprising the step of building a green tire by employing the green tire component as at least one portion of the green tire.

4. The method of claim 3, further comprising the step of curing the green tire.

5. The method of claim 1, where the weight ratio of the filler to the functionalized polymer introduced in said step of introducing is at least 0.4:1.

6. The method of claim 5, where the weight ratio of the filler to the functionalized polymer introduced in said step of introducing is at least 0.6:1.

7. The method of claim 6, where said step of introducing includes incrementally introducing a functionalized polymer, incremental introducing of filler, or both incremental introducing of functionalized polymer and filler.

8. The method of claim 1, where said step of mixing to form a first masterbatch includes sufficient mixing to achieve a dispersion index, per ASTM D2663-95a, part c using a Surfanalyzer, of at least 50.

9. The method of claim 1, where said step of mixing to form a first masterbatch includes sufficient mixing to achieve a dispersion index, per ASTM D2663-95a, part c using a Surfanalyzer, of at least 70.

10. The method of claim 1, where said additional polymer includes unfunctionalized polymer.

11. The method of claim 1, where the weight ratio of additional polymer to functionalized polymer is at least 0.18:1.

12. The method of claim 11, where the weight ratio of additional polymer to functionalized polymer is at least 0.4:1.

13. The method of claim 1, where said filler includes silica, and where a silica coupling agent is introduced prior to said step of adding additional polymer.

14. The method of claim 1, where said filler includes silica, and where a silica coupling agent is introduced after formation of the first masterbatch.

15. The method of claim 1, where the weight ratio of filler to functionalized polymer in said step of introducing is at most 1:1.

16. The method of claim 1, where the weight ratio of filler to functionalized polymer in said step of introducing is at most 0.9:1.

17. The method of claim 1, where the functionalized polymer has a Mn of at least 100 kg/mole.

18. The method of claim 17, where the functionalized polymer has an Mn of at least 200 kg/mole.

19. The method of claim 1, where the filler includes carbon black.

20. The method of claim 1, where the filler includes carbon black and silica.

21. The method of claim 1, where said step of mixing the blend of functionalized polymer and filler includes an initial mixing step, a cooling step, and a remill mixing step, where t equals the mixing time of the initial mixing step plus the mixing time of the remill mixing step.

* * * * *